United States Patent
Kato

(10) Patent No.: US 11,830,679 B2
(45) Date of Patent: *Nov. 28, 2023

(54) MULTI-LAYER CERAMIC ELECTRONIC COMPONENT

(71) Applicant: Taiyo Yuden Co., Ltd., Tokyo (JP)

(72) Inventor: Yoichi Kato, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,611

(22) Filed: May 16, 2022

(65) Prior Publication Data
US 2022/0277899 A1 Sep. 1, 2022

Related U.S. Application Data

(63) Continuation of application No. 16/422,365, filed on May 24, 2019, now Pat. No. 11,361,903.

(30) Foreign Application Priority Data

May 25, 2018 (JP) .................................. 2018-100926

(51) Int. Cl.
*H01G 4/30* (2006.01)
*H01G 4/224* (2006.01)
(Continued)

(52) U.S. Cl.
CPC ............... *H01G 4/30* (2013.01); *H01G 4/224* (2013.01); *H01G 4/1227* (2013.01); *H01G 4/248* (2013.01)

(58) Field of Classification Search
CPC ........ H01G 4/12; H01G 4/1209; H01G 4/248; H01G 4/1227; H01G 4/30; H01G 4/224; H10G 4/248
(Continued)

(56) References Cited

U.S. PATENT DOCUMENTS 10,446,321 B2 * 10/2019 Noda ..................... C03C 14/006
2003/0170432 A1 * 9/2003 Kobayashi ............... H01G 4/30
428/209
(Continued)

FOREIGN PATENT DOCUMENTS

JP 2014-204114 A 10/2014

OTHER PUBLICATIONS

Office Action dated Mar. 25, 2021 in U.S. Appl. No. 16/422,365.
(Continued)

*Primary Examiner* — Arun Ramaswamy
(74) *Attorney, Agent, or Firm* — Saliwanchik, Lloyd & Eisenschenk

(57) ABSTRACT

A multi-layer ceramic electronic component, including: a capacitance forming unit that includes internal electrodes and ceramic layers, the internal electrodes being laminated in a first direction via the ceramic layers; and a circumferential unit that is provided on a circumference of the capacitance forming unit and formed of insulating ceramics. The circumferential unit includes a cover that is provided to the capacitance forming unit outward in the first direction, a side margin that is provided to the capacitance forming unit outward in a second direction orthogonal to the first direction, and a grain growth region that is formed at a boundary between the cover and the side margin and includes crystal grains of the insulating ceramics, the crystal grains having a mean grain size larger than a mean grain size of the crystal grains at a center portion of the cover.

6 Claims, 10 Drawing Sheets

(51) Int. Cl.
*H01G 4/12* (2006.01)
*H01G 4/248* (2006.01)

(58) Field of Classification Search
USPC .... 361/301.4, 321.1, 321.2, 321.3, 311, 312, 361/321.5
See application file for complete search history.

(56) References Cited

U.S. PATENT DOCUMENTS

| | | |
|---|---|---|
| 2012/0250220 A1 | 10/2012 | Yamashita et al. |
| 2014/0022692 A1* | 1/2014 | Yoon ................. H01G 4/30 |
| | | 156/322 |
| 2014/0211367 A1 | 7/2014 | Morita et al. |
| 2014/0301012 A1 | 10/2014 | Kim |
| 2016/0196918 A1 | 7/2016 | Hong et al. |
| 2017/0243697 A1 | 8/2017 | Mizuno et al. |
| 2017/0287643 A1* | 10/2017 | Kobayashi .......... H01G 4/30 |
| 2018/0174755 A1* | 6/2018 | Kim .................. H01G 4/248 |
| 2018/0240592 A1* | 8/2018 | Morita ............... H01G 4/30 |

OTHER PUBLICATIONS

Office Action dated Oct. 1, 2021 in U.S. Appl. No. 16/422,365.
Notice of Allowance dated Feb. 16, 2022 in U.S. Appl. No. 16/422,365.

* cited by examiner

MULTI-LAYER CERAMIC ELECTRONIC COMPONENT

CROSS-REFERENCE TO RELATED APPLICATIONS

This application is a continuation of U.S. application Ser. No. 16/422,365, filed May 24, 2019; which claims the benefit of Japanese Application No. 2018-100926, filed May 25, 2018; which are hereby incorporated by reference in their entirety.

BACKGROUND

The present disclosure relates to a multi-layer ceramic electronic component such as a multi-layer ceramic capacitor.

In recent years, along with miniaturization of electronic devices and achievement of high performance thereof, there have been increasingly strong demands for miniaturization and an increase in capacitance with respect to multi-layer ceramic capacitors used in the electronic devices. In order to meet those demands, an attempt to make the thickness of a margin around the internal electrodes thinner in a ceramic body and to increase an intersectional area of the internal electrodes and the number of laminated layers is being made.

For example, Japanese Patent Application Laid-open No. 2014-204114 discloses a multi-layer ceramic capacitor including side margins that are formed to have a mean thickness of 18 μm or less.

SUMMARY

Meanwhile, there has been a problem that mechanical strength with respect to an external force is more reduced as a margin of the multi-layer ceramic electronic component becomes thinner, and sufficient reliability cannot be ensured.

In view of the circumstances as described above, it is desirable to provide a multi-layer ceramic electronic component having a small size and high reliability.

According to an embodiment of the present disclosure, there is provided a multi-layer ceramic electronic component including a capacitance forming unit and a circumferential unit.

The capacitance forming unit includes internal electrodes and ceramic layers, the internal electrodes being laminated in a first direction via the ceramic layers.

The circumferential unit includes a cover, a side margin, and a grain growth region and is provided on a circumference of the capacitance forming unit and formed of insulating ceramics.

The cover is provided to the capacitance forming unit outward in the first direction.

The side margin is provided to the capacitance forming unit outward in a second direction orthogonal to the first direction.

The grain growth region is formed at a boundary between the cover and the side margin and includes crystal grains of the insulating ceramics, the crystal grains having a mean grain size larger than a mean grain size of the crystal grains at a center portion of the cover.

Since the multi-layer ceramic electronic component includes the grain growth region in which the ceramic crystal grains at the boundary between the cover and the side margin have a large mean grain size, crystal grain boundaries that are likely to become the starting point of cracks can be decreased in that region. Accordingly, when the multi-layer ceramic electronic component receives an external force, the occurrence and progress of the crack at the boundary between the cover and the side margin can be suppressed. Therefore, also when the circumferential unit is configured to be thinner, the mechanical strength with respect to the external force in the multi-layer ceramic electronic component can be enhanced. Thus, a multi-layer ceramic electronic component having a small size and high reliability can be provided.

Specifically, the mean grain size of the crystal grains of the insulating ceramics in the grain growth region may be 300 nm or more.

Accordingly, in the multi-layer ceramic electronic component, the mechanical strength with respect to the external force can be sufficiently enhanced.

The circumferential unit can be configured to be very thin. For example, the side margin may have a thickness dimension of 20 μm or less in the second direction.

Further, the cover may have a thickness dimension of 20 μm or less in the first direction.

In such a manner, also when the circumferential unit is made thin, the mechanical strength with respect to the external force can be sufficiently enhanced.

Furthermore, the mean grain size of the crystal grains of the insulating ceramics in the grain growth region may be larger than a mean grain size of the crystal grains of the insulating ceramics at a center portion of the side margin.

Accordingly, the mechanical strength with respect to the external force in the multi-layer ceramic electronic component can further be enhanced.

Positions of end portions of the internal electrodes in the second direction may be aligned with one another within a range of 0.5 μm in the second direction.

Accordingly, it is possible to increase an intersectional area of the internal electrodes in the multi-layer ceramic electronic component and provide a multi-layer ceramic electronic component having a small size and high performance.

As described above, according to the present disclosure, it is possible to provide a multi-layer ceramic electronic component having a small size and high reliability.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, embodiments of the present disclosure will be described with reference to the drawings.

In the figures, an X axis, a Y axis, and a Z axis orthogonal to one another are shown as appropriate. The X axis, the Y axis, and the Z axis are common in all figures.

I First Embodiment

1. Basic Configuration of Multi-Layer Ceramic Capacitor 10

Figure 1:
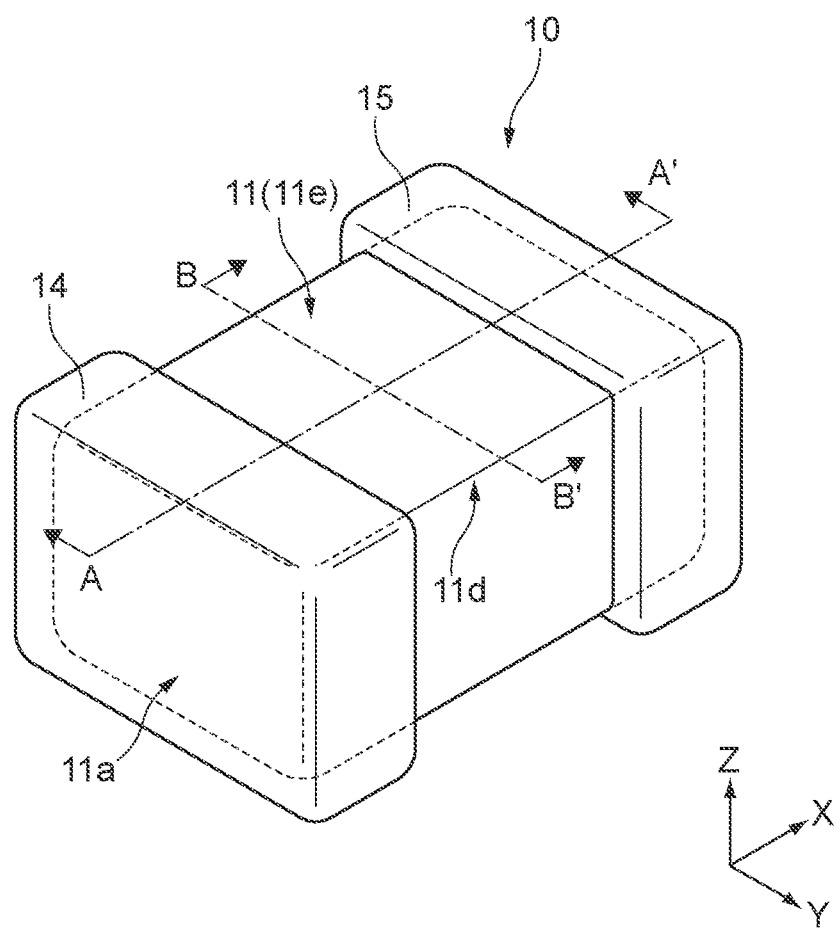
FIG. 1 is a perspective view of a multi-layer ceramic capacitor according to a first embodiment of the present disclosure.
Figure 2:
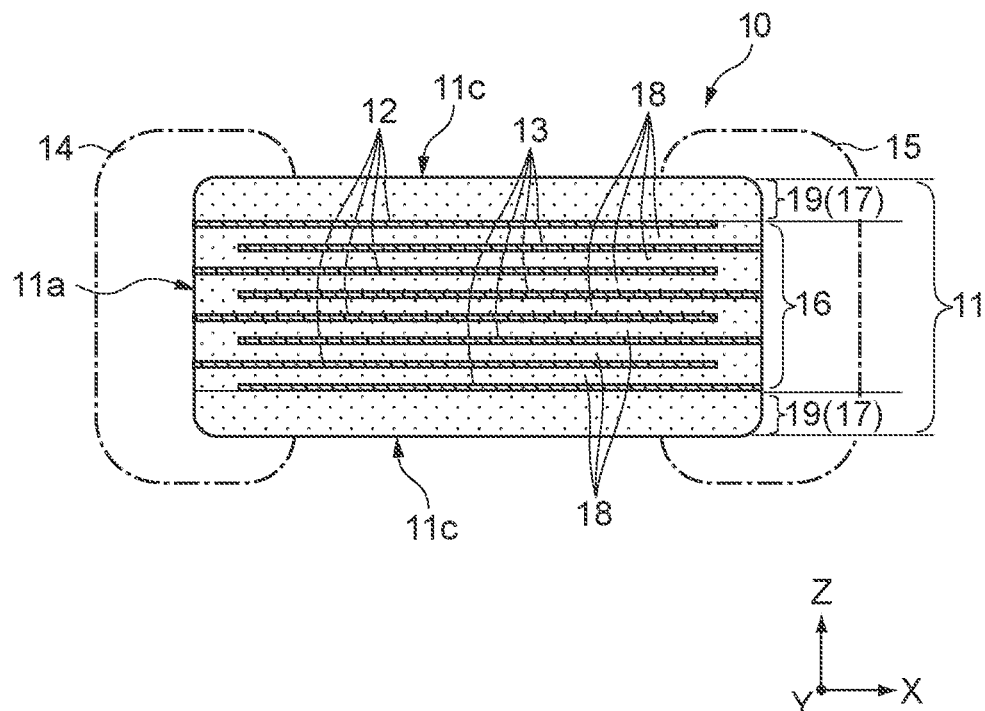
FIG. 2 is a cross-sectional view of the multi-layer ceramic capacitor taken along the A-A' line in FIG. 1.
Figure 3:
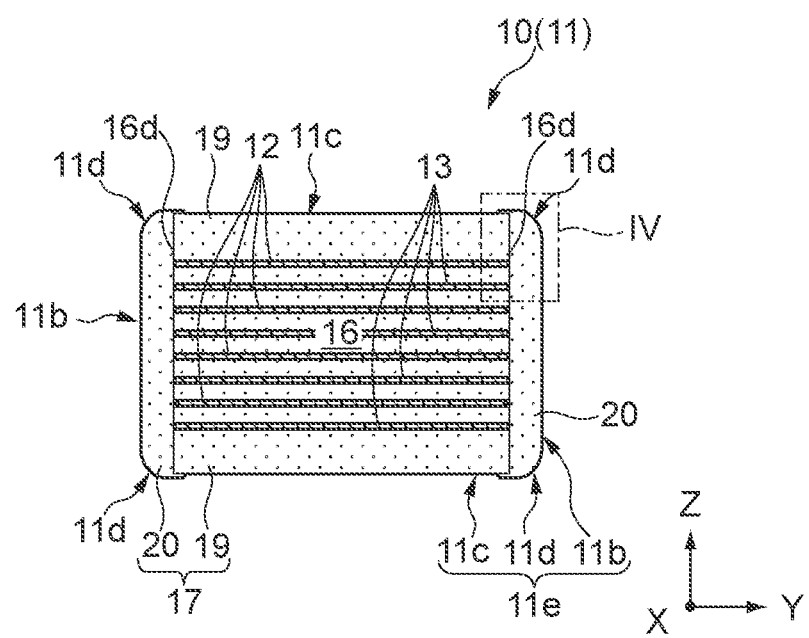
FIG. 3 is a cross-sectional view of the multi-layer ceramic capacitor taken along the B-B' line in FIG. 1.

FIGS. 1 to 3 each show a multi-layer ceramic capacitor 10 according to a first embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15.

The ceramic body 11 has, for example, two end surfaces 11a facing in the X-axis direction and a circumferential surface 11e connected to the end surfaces 11a. The circumferential surface 11e includes two side surfaces 11b facing in the Y-axis direction, two main surfaces 11c facing in the Z-axis direction, and curved surfaces 11d connecting the side surfaces 11b and the main surfaces 11c. The end surfaces 11a, the side surfaces 11b, and the main surfaces 11c are all constituted by substantially flat surfaces. Ridges connecting the end surfaces 11a and the circumferential surface 11e may be constituted by curved surfaces like the curved surfaces 11d. It should be noted that the ceramic body 11 is not limited to have a rectangular parallelepiped shape as shown in FIGS. 1 to 3.

The first external electrode 14 and the second external electrode 15 are provided to the end surfaces 11a and face each other in the X-axis direction while sandwiching the ceramic body 11 therebetween. The first external electrode 14 and the second external electrode 15 extend from the respective end surfaces 11a to the circumferential surface 11e of the ceramic body 11. With this configuration, both of the first external electrode 14 and the second external electrode 15 have U-shaped cross sections parallel to the X-Z plane and the X-Y plane.

The ceramic body 11 includes a capacitance forming unit 16 and a circumferential unit 17 that is provided on the circumference of the capacitance forming unit 16.

The capacitance forming unit 16 is constituted as a multi-layer unit having a substantially rectangular parallelepiped shape and including first internal electrodes 12 and second internal electrodes 13 alternately laminated in the Z-axis direction via ceramic layers 18 (see FIG. 2). End portions of the outermost first and second internal electrodes 12 and 13 of the capacitance forming unit 16 in the Y- and Z-axis directions are assumed as end portions 16d.

The first and second internal electrodes 12 and 13 extend along the X-Y plane and are formed over the entire width of the capacitance forming unit 16 in the Y-axis direction. The positions of the end portions of the first and second internal electrodes 12 and 13 in the Y-axis direction are aligned with one another along the Y-axis direction within the range of 0.5 μm, for example. The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal or alloy mainly containing copper (Cu), palladium (Pd), platinum (Pt), silver (Ag), gold (Au), or the like.

The first internal electrodes 12 extend in the X-axis direction to the end surface 11a that comes into contact with the first external electrode 14 and are apart from the second external electrode 15. The second internal electrodes 13 extend in the X-axis direction to the end surface 11a that comes into contact with the second external electrode 15 and are apart from the first external electrode 14. Accordingly, the first internal electrodes 12 are connected to only the first external electrode 14, and the second internal electrodes 13 are connected to only the second external electrode 15.

With such a configuration, when a voltage is applied between the first external electrode 14 and the second external electrode 15 in the multi-layer ceramic capacitor 10, the voltage is applied to the ceramic layers 18 between the first internal electrodes 12 and the second internal electrodes 13. Accordingly, the multi-layer ceramic capacitor 10 stores charge corresponding to the voltage applied between the first external electrode 14 and the second external electrode 15.

The ceramic layers 18 are formed of dielectric ceramics having a high dielectric constant, for example. Accordingly, the capacitances of the respective ceramic layers 18 can be increased. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layers 18 may be formed of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

2. Detailed Configuration of Circumferential Unit 17

Figure 4:
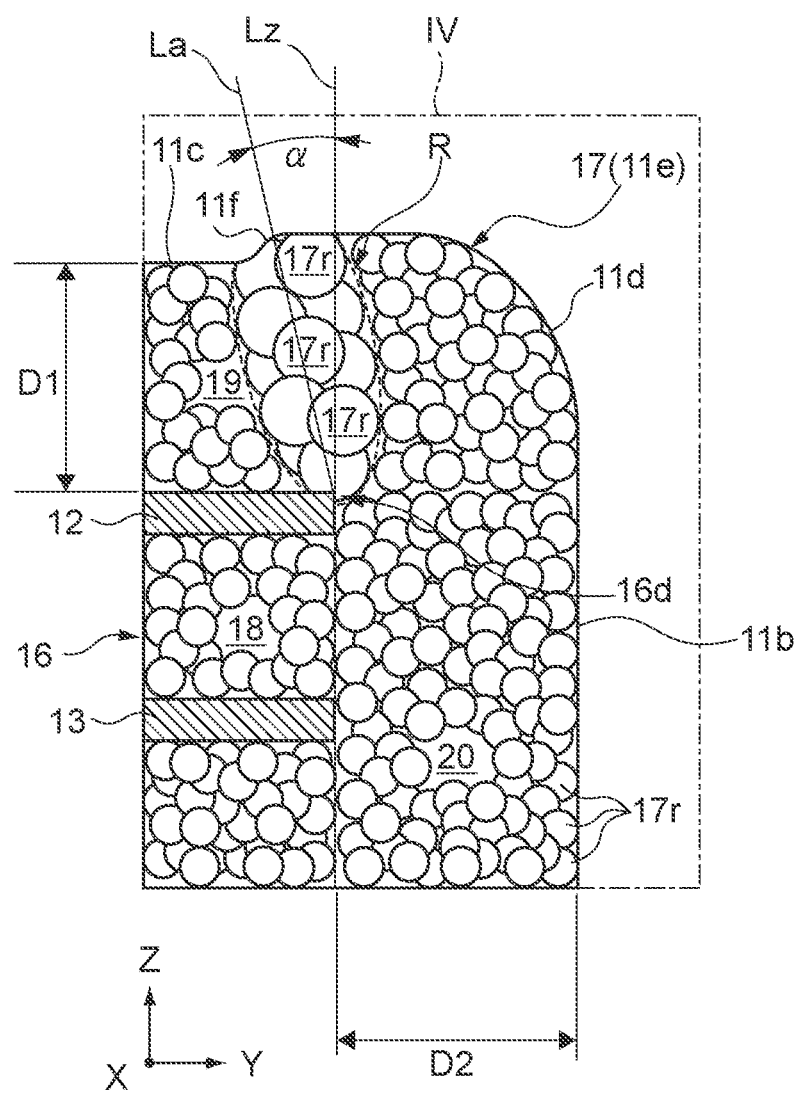
FIG. 4 is an enlarged view of a region IV of the multi-layer ceramic capacitor in FIG. 3.

FIG. 4 is an enlarged view of a region IV in FIG. 3 and also a cross-sectional view showing the vicinity of a boundary between a cover 19 and a side margin 20 in an enlarged manner.

The circumferential unit 17 has functions of protecting the capacitance forming unit 16 and ensuring insulation properties of the first and second internal electrodes 12 and 13. The circumferential unit 17 is constituted as a ceramic sintered body and includes a plurality of crystal grains 17r of insulating ceramics. The circumferential unit 17 may be formed of insulating ceramics different from that of the ceramic layers 18. However, from the viewpoint of suppression of internal stress in the ceramic body 11, the circumferential unit 17 is favorably formed of dielectric ceramics similar to that of the ceramic layers 18.

The circumferential unit 17 includes the covers 19, the side margins 20, and grain growth regions R. The surface of the circumferential unit 17 constitutes the circumferential surface 11e of the ceramic body 11.

The covers 19 are provided to the capacitance forming unit 16 outward in the Z-axis direction and cover the outermost layers of the capacitance forming unit 16 from the Z-axis direction. As shown in FIG. 4, a thickness dimension D1 of the cover 19 along the Z-axis direction is, for example, 20 µm or less, and favorably 10 µm or more and 20 µm or less. The thickness dimension D1 is a dimension along the Z-axis direction from the center portion of the main surface 11c in the X- and Y-axis directions to the capacitance forming unit 16.

The side margins 20 are provided to the capacitance forming unit 16 outward in the Y-axis direction. In this embodiment, the side margins 20 cover the capacitance forming unit 16 and the covers 19 from the Y-axis direction. As shown in FIG. 4, a thickness dimension D2 of the side margin 20 along the Y-axis direction is, for example, 20 µm or less, and favorably 10 µm or more and 20 µm or less. The thickness dimension D2 is a dimension along the Y-axis direction from the center portion of the side surface 11b in the X- and Z-axis directions to the capacitance forming unit 16.

The grain growth region R is a region in which the crystal grains 17r of insulating ceramics have a larger mean crystal grain size than that at the center portion of the cover 19 in the Y-axis direction. The mean crystal grain size in the grain growth region R is favorably 300 nm or more, and more favorably 500 nm or more. Further, the mean crystal grain size in the grain growth region R is formed to be larger than the mean crystal grain size at the center portion of the cover 19, for example, by 50% or more. The center portion of the cover 19 is the center portion of the cover 19 in the X-, Y-, and Z-axis directions. The mean crystal grain size at the center portion of the cover 19 is not particularly limited and is, for example, 100 nm to 300 nm.

Furthermore, the mean crystal grain size of the ceramic crystal grains 17r in the grain growth region R may be larger than the mean crystal grain size at the center portion of the side margin 20. The center portion of the side margin 20 is the center portion of the side margin 20 in the X-, Y-, and Z-axis directions.

The mean crystal grain size is calculated as follows. First, a cross section of the grain growth region R is imaged with a scanning electron microscope or a transmission electron microscope. A that time, imaging is performed while adjusting the magnification such that approximately 1,000 to 3,000 crystal grains 17r can be captured in one image, and the crystal grain size of the 10,000 or more crystal grains 17r in total is measured using a plurality of images. The crystal grain size is calculated by measuring a cross-sectional area of the crystal grain and setting a diameter of a circle having the same cross-sectional area as the crystal grain size. A median value of the measured crystal grain size of the 10,000 or more crystal grains 17r is set as a mean crystal grain size.

The grain growth region R is formed, for example, between the end portion 16d of the capacitance forming unit 16 and the circumferential surface 11e of the ceramic body 11. The grain growth region R may be formed between the end portion 16d and the curved surface 11d. The grain growth region R is typically formed to reach the circumferential surface 11e from the end portion 16d, but may not reach the circumferential surface 11e or may be apart from the end portion 16d.

When seen from the X-axis direction, for example, the grain growth region R extends along a straight line La that forms an acute angle α of 0 degrees or more and 45 degrees or less together with a straight line Lz that extends from the end portion 16d in parallel to the Z-axis direction. The straight line La may be a straight line that forms the acute angle α from the straight line Lz toward the cover 19 side or may be a straight line that forms the acute angle α from the straight line Lz toward the side margin 20 side.

The cross-sectional shape of the grain growth region R seen from the X-axis direction is not limited to a belt-like shape extending with substantially the same width and may be widened toward the cover 19 side and the side margin 20 side at a middle portion between the end portion 16d and the circumferential surface 11e. Alternatively, the cross-sectional shape of the grain growth region R may be a shape protruding toward at least one of the circumferential surface 11e side or the end portion 16d side.

Here, a crystal grain boundary between the ceramic crystal grains 17r has low mechanical strength than that within the crystal grains 17r. In other words, when the multi-layer ceramic capacitor 10 receives an external force, the crystal grain boundary is likely to become the starting point of a crack. When a crack occurs, the crack is likely to progress along the crystal grain boundary.

Since the grain growth region R includes large crystal grains 17r and a few crystal grain boundaries that may become the starting point of cracks, the occurrence and progress of cracks can be suppressed.

Furthermore, the curved surface 11d exists in the grain growth region R and the vicinity thereof. The curved surface 11d is likely to be subjected to an external force and particularly likely to cause cracks. In this embodiment, when the grain growth region R is provided to the curved surface 11d and the vicinity thereof, cracks can be effectively inhibited from occurring.

When at least one of the cover 19 or the side margin 20 is formed to be very thin, e.g., 20 µm or less, a crack easily reaches the capacitance forming unit 16. If the crack reaches the capacitance forming unit 16, the insulation properties or environmental resistance of the multi-layer ceramic capacitor 10 are reduced, which may cause a short circuit. When the grain growth region R is provided to the circumferential unit 17, the crack can be inhibited from reaching the capacitance forming unit 16 even if the circumferential unit 17 is thin. Therefore, both of miniaturization and an improvement in reliability of the multi-layer ceramic capacitor 10 can be satisfied.

Further, in the circumferential unit 17, its thickness in the vicinity of the end portion 16d of the capacitance forming unit 16 is particularly likely to be thin. In this regard, the curved surface 11d may include an extended portion 11f that is formed to be extended inward in the Y-axis direction relative to the end portion 16d and to protrude from the main surface 11c in the Z-axis direction. Accordingly, the thickness of the circumferential unit 17 in the vicinity of the end portion 16d of the capacitance forming unit 16 can be sufficiently ensured, and the insulation properties and environmental resistance of the multi-layer ceramic capacitor 10 can be ensured.

If the curved surface 11d includes the extended portion 11f, the grain growth region R may be formed to reach the extended portion 11f of the curved surface 11d. Accordingly, the occurrence and progress of the crack in the vicinity of the end portion 16d can be suppressed, and the insulation properties and environmental resistance of the multi-layer ceramic capacitor 10 can be improved.

As described above, according to this embodiment, the multi-layer ceramic capacitor 10 having a small size and high insulation properties and environmental resistance can be provided. In other words, it is possible to enhance the reliability of the multi-layer ceramic capacitor 10 and also improve its lifetime.

3. Method of Producing Multi-Layer Ceramic Capacitor 10

Figure 5:
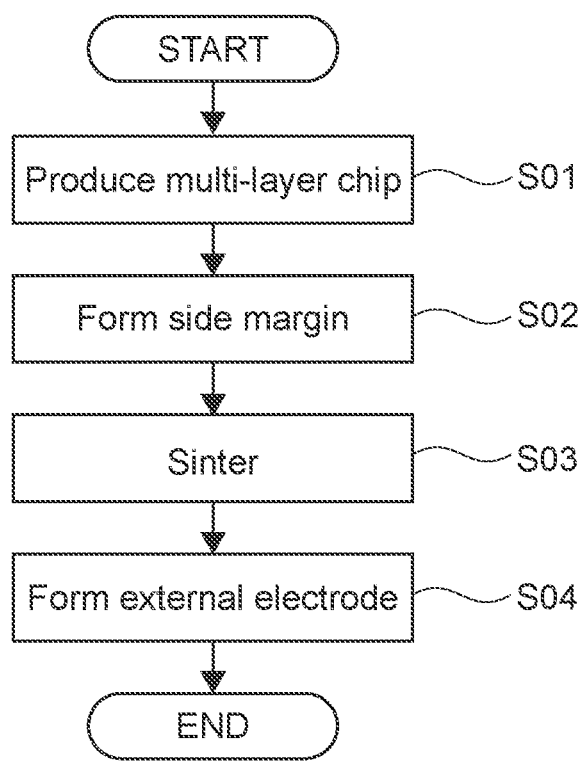
FIG. 5 is a flowchart showing a method of producing the multi-layer ceramic capacitor.

FIG. 5 is a flowchart showing a method of producing the multi-layer ceramic capacitor 10. FIGS. 6 to 10 are views each schematically showing a production process of the multi-layer ceramic capacitor 10. Hereinafter, the method of producing the multi-layer ceramic capacitor 10 will be described according to FIG. 5 with reference to FIGS. 6 to 10 as appropriate.

3.1 Step S01: Production of Multi-Layer Chip

Figure 6:
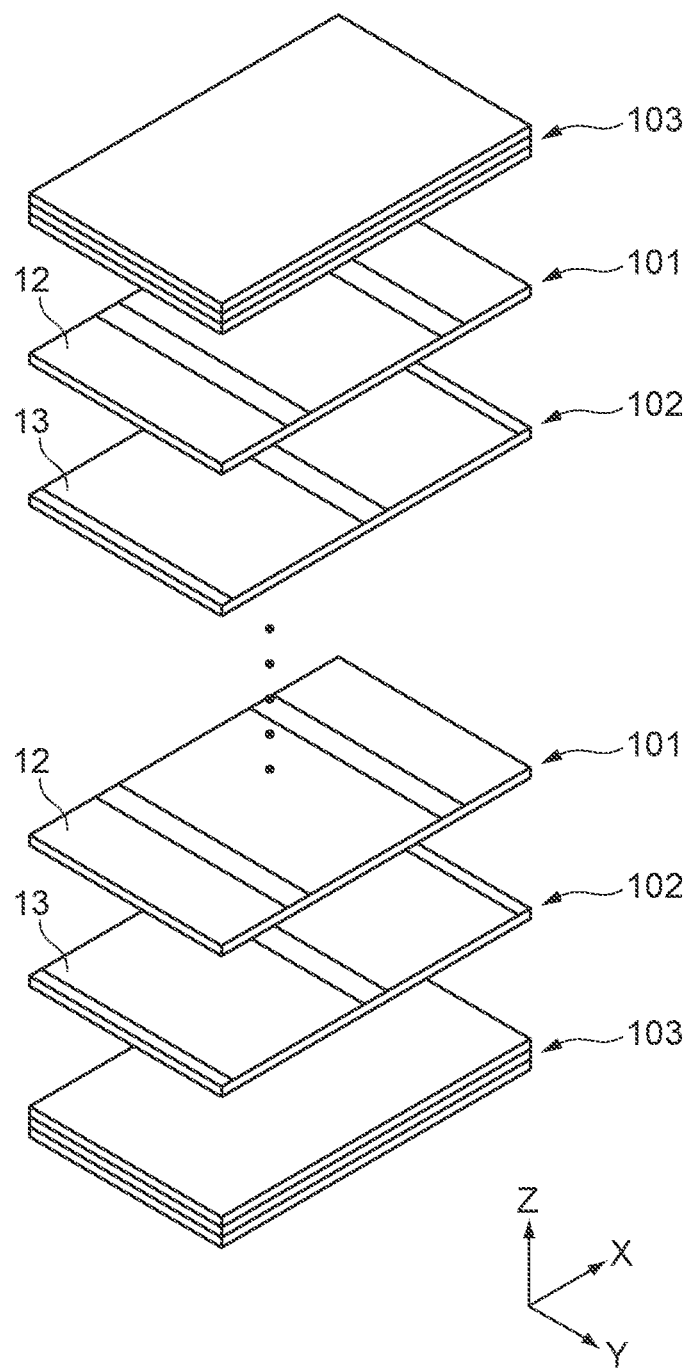
FIG. 6 is a perspective view showing a production process of the multi-layer ceramic capacitor.
Figure 7:
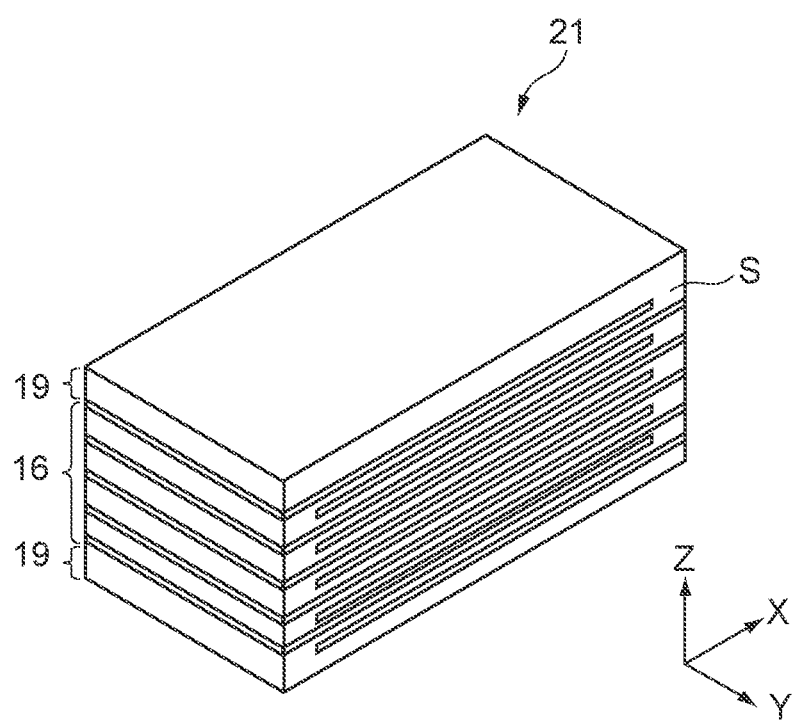
FIG. 7 is a perspective view showing a production process of the multi-layer ceramic capacitor.

In Step S01, first ceramic sheets 101 and second ceramic sheets 102 for forming the capacitance forming unit 16, and third ceramic sheets 103 for forming the covers 19 are prepared and then laminated and cut as shown in FIG. 6, thus producing an unsintered multi-layer chip 21 shown in FIG. 7.

The first, second, and third ceramic sheets 101, 102, and 103 are unsintered dielectric green sheets mainly containing dielectric ceramics and are large-sized sheets for producing the plurality of multi-layer chips 21. Unsintered first internal electrodes 12 are formed on the first ceramic sheet 101. Unsintered second internal electrodes 13 are formed on the second ceramic sheet 102. No internal electrodes are formed on the third ceramic sheet 103.

In Step S01, the first ceramic sheets 101 and the second ceramic sheets 102 are alternately laminated, and the third ceramic sheets 103 are laminated on the upper and lower surfaces of the laminate of those first and second ceramic sheets 101 and 102 in the Z-axis direction. The number of third ceramic sheets 103 is not limited to the example shown in FIG. 6 and can be adjusted such that the thickness dimension of the cover 19, which is to be obtained after sintering, along the Z-axis direction is 20 μm or less, for example.

Subsequently, the first, second, and third ceramic sheets 101, 102, and 103 thus laminated are pressure-bonded, and the pressure-bonded sheet is cut to be singulated. Accordingly, as shown in FIG. 7, a multi-layer chip 21 including an unsintered capacitance forming unit 16 and unsintered covers 19 is obtained.

3.2 Step S02: Formation of Side Margin

In Step S02, unsintered side margins 20 are provided to the side surfaces S of the multi-layer chip 21 produced in Step S01, to produce an unsintered ceramic body 11. Hereinafter, description will be given on an example of a method of providing the unsintered side margins 20 to the side surfaces S of the multi-layer chip 21 in Step S02.

Figure 8:
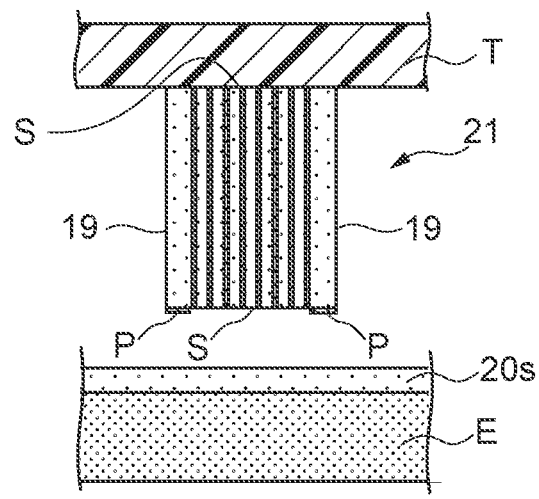
FIG. 8 is a cross-sectional view showing a production process of the multi-layer ceramic capacitor.

First, as shown in FIG. 8, a ceramic sheet 20s is disposed on a flat plate-like base member E, and one side surface S of the multi-layer chip 21, the other side surface S of which is held with a tape T, is caused to face the ceramic sheet 20s. The base member E is formed of, for example, a soft material having a small Young's modulus, such as a silicone-based elastomer.

A paste P containing titanium oxide ($TiO_2$) is applied to the side surfaces of the covers 19 facing the ceramic sheet 20s. The paste P containing titanium oxide enhances adhesiveness between the ceramic sheet 20s and the multi-layer chip 21 and also prompts formation of the grain growth region R as will be described later.

The ceramic sheet 20s is constituted as a large-sized dielectric green sheet for forming the unsintered side margin 20. The ceramic sheet 20s can be formed into a flat sheet having a uniform thickness by using a roll coater or a doctor blade, for example. The thickness dimension of the ceramic sheet 20s is adjusted such that the thickness dimension of the side margin 20, which is to be obtained after sintering, is 20 μm or less, for example.

Figure 9:
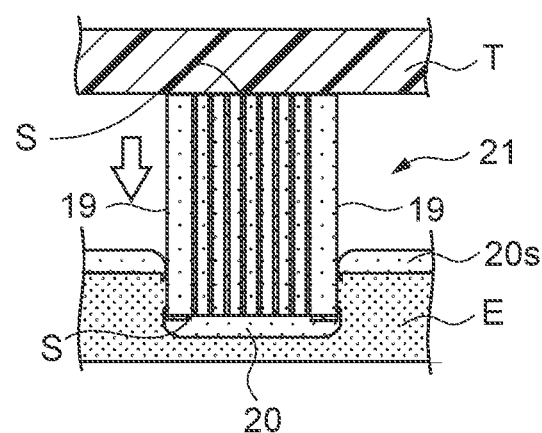
FIG. 9 is a cross-sectional view showing a production process of the multi-layer ceramic capacitor.
Figure 10:
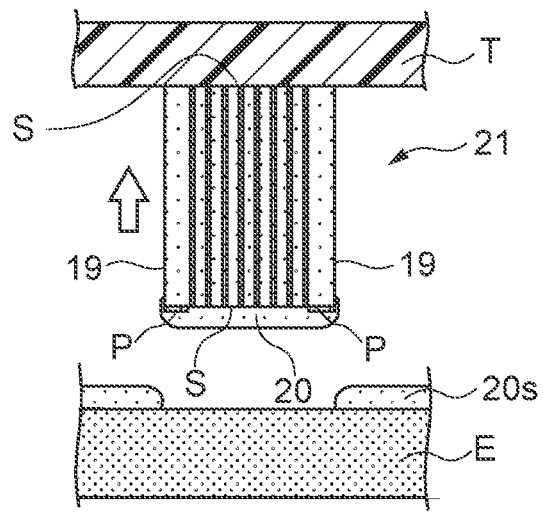
FIG. 10 is a cross-sectional view showing a production process of the multi-layer ceramic capacitor.
Figure 10:
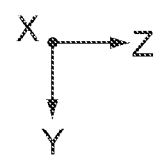

Next, as shown in FIG. 9, the ceramic sheet 20s is pressed by the side surface S of the multi-layer chip 21. The multi-layer chip 21 locally sinks deep into the base member E together with the ceramic sheet 20s. Accordingly, the portion of the ceramic sheet 20s, which sinks together with the multi-layer chip 21, is cut off as the side margin 20, and an unsintered ceramic body 11 including the unsintered capacitance forming unit 16 and the unsintered circumferential unit 17 (covers 19 and side margins 20) is produced.

Further, when a soft material is used as the base member E, the multi-layer chip 21 sinks deep into the ceramic sheet 20s and receives a pressing force from the base member E. Thus, the corners of the end portions of the side margin 20 are crushed. Accordingly, the end portions of the side margin 20 are rounded, and the curved surfaces 11d are thus formed. Further, when being cut off from the ceramic sheet 20s, the end portion of the curved surface 11d is stretched along the multi-layer chip 21, and the extended portion 11f is thus formed.

3.3 Step S03: Sintering

In Step S03, the unsintered ceramic body 11 obtained in Step S02 is sintered, to produce the ceramic body 11 of the multi-layer ceramic capacitor 10 shown in FIGS. 1 to 3.

A sintering temperature in Step S03 can be determined on the basis of a sintering temperature for the ceramic body 11. For example, when a barium titanate ($BaTiO_3$) based material is used, the sintering temperature can be set to approximately 1,000 to 1,300° C. Further, sintering can be performed in a reduction atmosphere or a low-oxygen partial pressure atmosphere, for example.

By sintering, the grain growth of the ceramic crystal grains progresses in the ceramic body 11, and the ceramic body 11 is densified. In the vicinity of the boundary between the cover 19 and the side margin 20, titanium (Ti) and oxygen ($O_2$), which are contained in the applied paste P containing titanium oxide, are diffused. Accordingly, the ceramic crystal grains take in atoms of titanium (Ti) and oxygen ($O_2$), and the grain growth is particularly prompted. Thus, the grain growth region R is formed at the boundary.

The method of forming the grain growth region R is not limited to the application of the paste P containing titanium oxide. For example, the grain growth can be prompted by controlling the shrinkage behavior of the covers 19 and the side margins 20 at the time of sintering and applying internal stress to the boundaries therebetween.

3.4 Step S04: Formation of External Electrode

In Step S04, the first external electrode 14 and the second external electrode 15 are formed on both the end portions of the ceramic body 11 in the X-axis direction obtained in Step S03, to produce the multi-layer ceramic capacitor 10 shown in FIGS. 1 to 3. The method of forming the first external electrode 14 and the second external electrode 15 in Step S04 is optionally selectable from publicly known methods.

It should be noted that the first external electrode 14 and the second external electrode 15 may be simultaneously sintered together with the unsintered ceramic body 11. In other words, the first external electrode 14 and the second external electrode 15 can also be formed by forming unsintered external electrodes at both end portions of the unsintered ceramic body 11 in the X-axis direction after Step S02 and then simultaneously sintering them together with the unsintered ceramic body 11 in Step S03.

By the above steps, the multi-layer ceramic capacitor 10 is completed. In this production method, the side margins 20 are provided to the side surfaces S, from which the first and second internal electrodes 12 and 13 are exposed, of the multi-layer chip 21 in a later step. Thus, the positions of the end portions of the first and second internal electrodes 12 and 13 in the Y-axis direction in the ceramic body 11 are aligned with one another along the Z-axis direction with variations of 0.5 μm or less.

In order to confirm that the multi-layer ceramic capacitor 10 actually has high mechanical strength, the following two types of samples were produced as Example and Comparative example.

First, as Example, samples of a multi-layer ceramic capacitor including a grain growth region were produced by the production method described above. Those samples were designed such that the dimension of a ceramic body, which is to be obtained after sintering, in the X-axis direction is set to 1 mm, the dimensions thereof in the Y- and Z-axis directions are set to 0.5 mm, the thickness dimension D1 of the cover is 20 μm, and the thickness dimension D2 of the side margin is 20 μm. Further, a mean crystal grain size of the grain growth region was 500 nm, and a mean crystal grain size at the center portion of the cover was 200 nm.

As Comparative example, samples having the same size and basic configuration as those of the samples of the multi-layer ceramic capacitor according to Example and having no grain growth region were produced.

A drop test was performed on 1,000 samples of each of Example and Comparative example, to calculate an occurrence rate of cracks at the boundary. The drop test was performed by dropping the samples one by one from the height of 0.5 m. The occurrence of cracks was visually confirmed.

As a result, in the samples of Example, samples that had cracks out of the 1,000 samples were zero, whereas in the samples of Comparative example, three samples out of the 1,000 samples had cracks. Accordingly, it was confirmed that the formation of the grain growth region at the boundary between the cover and the side margin allows an increase in mechanical strength of the multi-layer ceramic capacitor and also an improvement in reliability thereof.

II Second Embodiment

In the first embodiment described above, the configuration in which the side margins 20 cover the covers 19 and the capacitance forming unit 16 from the Y-axis direction has been described, but the present disclosure is not limited to this configuration. It should be noted that, in the following description, configurations similar to those in the first embodiment are denoted by the same reference symbols and description thereof will be omitted.

Figure 11:
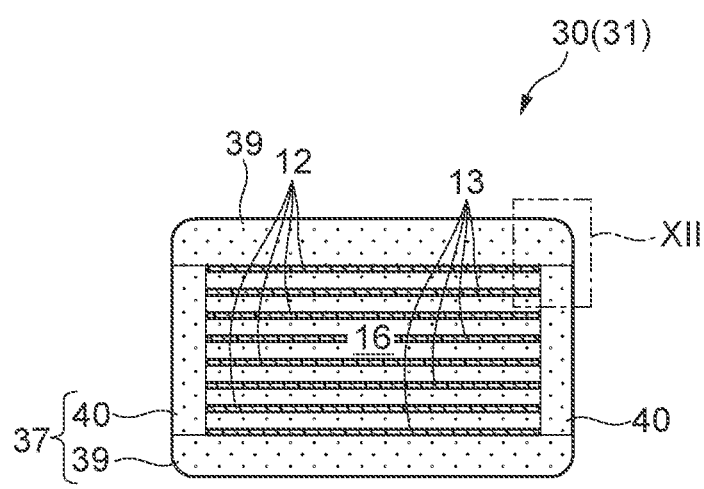
FIG. 11 is a cross-sectional view of a multi-layer ceramic capacitor according to a second embodiment of the present disclosure.
Figure 11:
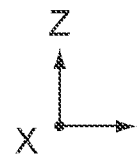
Figure 12:
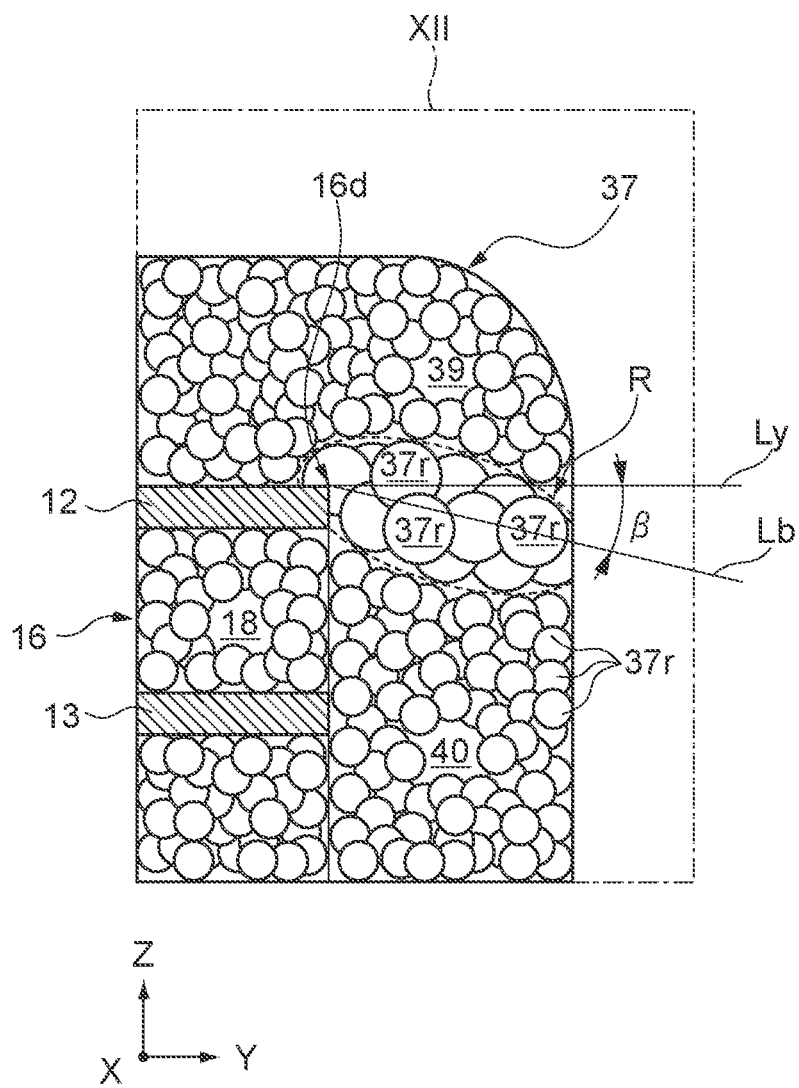
FIG. 12 is an enlarged view of a region XII of the multi-layer ceramic capacitor in FIG. 11.

FIGS. 11 and 12 are views showing a multi-layer ceramic capacitor 30 according to a second embodiment of the present disclosure. FIG. 11 is a cross-sectional view of the multi-layer ceramic capacitor cut at a position similar to that in FIG. 3. FIG. 12 is an enlarged view of a region XII of FIG. 11 and is also an enlarged cross-sectional view thereof cut at a position similar to that of FIG. 4.

The multi-layer ceramic capacitor 30 includes a capacitance forming unit 16 and a circumferential unit 37 including covers 39 and side margins 40. The covers 39 cover the capacitance forming unit 16 and the side margins 40 from the Z-axis direction.

In the example shown in FIG. 12, a grain growth region R formed at a boundary between the cover 39 and the side margin 40 extends along a straight line Lb that forms an acute angle β of 45 degrees or less together with a straight line Ly that extends from an end portion 16d in parallel to the Y-axis direction. The straight line Lb may be a straight line that extends toward the side margin 40 side relative to the straight line Ly or may be a straight line that extends toward the cover 39 side relative to the straight line Ly. The cross-sectional shape of the grain growth region R may have various shapes as described in the first embodiment.

Figure 13:
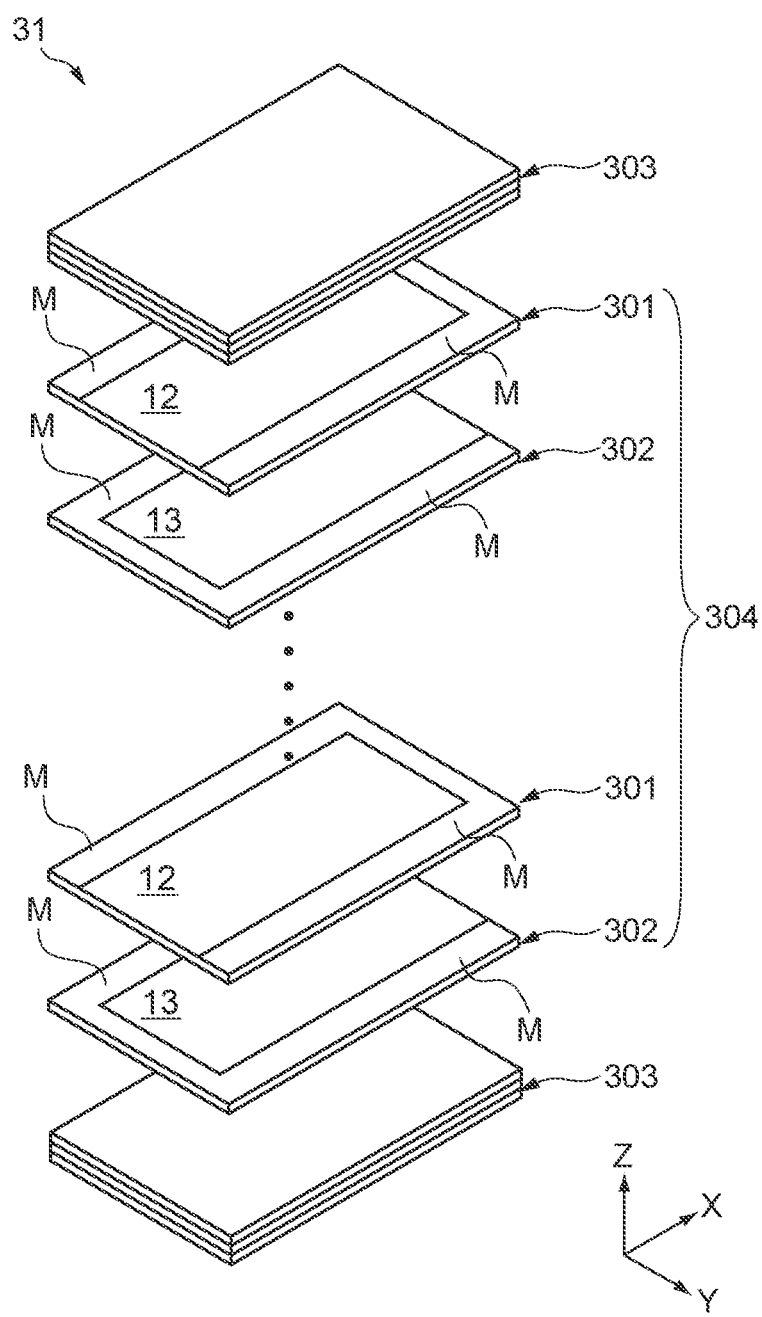
FIG. 13 is a perspective view showing a production process of the multi-layer ceramic capacitor.

FIG. 13 is a view showing a production process of the multi-layer ceramic capacitor 30 and is also a perspective view showing a multi-layer structure of an unsintered ceramic body 31.

As shown in FIG. 13, ceramic sheets 301 and 302 including first internal electrodes 12 and second internal electrodes 13, respectively, which are patterned to have side margins M at both the end portions of the ceramic sheets 301 and 302 in the Y-axis direction, are laminated to form a multi-layer unit 304. Ceramic sheets 303 to form the covers 39 are laminated on the upper and lower surfaces of the multi-layer unit 304 in the Z-axis direction. Accordingly, an unsintered ceramic body 31 is produced. Also in this case, a multi-layer sheet actually configured as a large-sized sheet is formed and then singulated into multi-layer units, each of which corresponds to a single ceramic body 31.

In this embodiment, for example, a paste containing titanium oxide is applied to the side margins M of the outermost ceramic sheets 301 and 302 in the multi-layer unit 304 including the ceramic sheets 301 and 302. Accordingly, in the sintering step, as in the first embodiment, the grain growth of the ceramic crystal grains at the boundary between the side margin 40 and the cover 39 is prompted, and a grain growth region R is thus formed.

III Other Embodiments

Hereinabobve, the embodiments of the present disclosure have been described, but the present disclosure is not limited to the embodiments described above, and it should be appreciated that the present disclosure may be variously modified without departing from the gist of the present disclosure.

For example, in the embodiments described above, the multi-layer ceramic capacitor 10 has been described as an example of a multi-layer ceramic electronic component, but the present disclosure can be applied to general multi-layer ceramic electronic components. Examples of such multi-layer ceramic electronic components include a chip varistor, a chip thermistor, and a multi-layer inductor.

What is claimed is:

1. A multi-layer ceramic electronic component, comprising:
   a multi-layer chip that includes
      a capacitance forming unit including internal electrodes and ceramic layers, the internal electrodes being laminated in a first direction via the ceramic layers;
      a cover covering the capacitance forming unit from the first direction;
      a main surface facing in the first direction; and
      a side surface facing in a second direction orthogonal to the first direction,
   a side margin that covers the capacitance forming unit and the cover from the second direction; and a grain growth region that is formed at a boundary between the cover and the side margin, and that includes crystal grains of the insulating ceramics, wherein the crystal grains in the grain growth region have a mean grain size larger than a mean grain size of crystal grains at a center portion of the cover, wherein the grain growth region has an extended portion extended from the side surface to the main surface, wherein the grain growth region extends continuously from the main surface to an outermost internal electrode of the capacitance forming unit, and wherein the grain growth region is absent between the side margin and the capacitance forming unit.

2. The multi-layer ceramic electronic component according to claim 1, wherein
the mean grain size of the crystal grains of the insulating ceramics in the grain growth region is 300 nm or more.

3. The multi-layer ceramic electronic component according to claim 1, wherein
the side margin has a thickness dimension of 20 μm or less in the second direction.

4. The multi-layer ceramic electronic component according to claim 1, wherein
the cover has a thickness dimension of 20 μm or less in the first direction.

5. The multi-layer ceramic electronic component according to claim 1, wherein
the mean grain size of the crystal grains of the insulating ceramics in the grain growth region is larger than a mean grain size of the crystal grains of the insulating ceramics at a center portion of the side margin.

6. The multi-layer ceramic electronic component according to claim 1, wherein positions of end portions of the internal electrodes in the second direction are aligned with one another within a range of 0.5 μm in the second direction.

* * * * *